United States Patent [19]

Dromigny

[11] Patent Number: 4,784,592
[45] Date of Patent: Nov. 15, 1988

[54] MACHINE FOR MOLDING OBJECTS

[76] Inventor: Pierre Dromigny, 54 avenue de Versailles, 75016 Paris, France

[21] Appl. No.: 110,277

[22] Filed: Oct. 20, 1987

[30] Foreign Application Priority Data

Nov. 19, 1986 [FR] France .................... 86 16100

[51] Int. Cl.[4] ............... B29C 41/20; B29C 41/36
[52] U.S. Cl. ................... 425/121; 425/125; 425/397; 425/441; 425/126.1
[58] Field of Search ............ 425/121, 125, 126 R, 425/130, 397, 436 R, 437, 441

[56] References Cited

U.S. PATENT DOCUMENTS

| | | | |
|---|---|---|---|
| 3,454,991 | 7/1969 | Rees .................................. | 18/30 |
| 3,941,539 | 3/1976 | Saumsiegle et al. ............ | 425/441 X |
| 4,204,824 | 5/1980 | Paradis .............................. | 425/436 |
| 4,233,006 | 11/1980 | Panas ............................... | 425/441 X |
| 4,281,707 | 8/1981 | Leleu .............................. | 425/441 X |
| 4,368,018 | 1/1983 | Rees et al. ..................... | 425/138 |
| 4,462,952 | 7/1984 | Hautemont ................... | 425/126 R X |
| 4,540,460 | 9/1985 | Blomquist et al. ......... | 425/126 R X |
| 4,549,863 | 10/1985 | Bourgeois ................... | 425/126 |
| 4,563,148 | 1/1986 | Hasl et al. .................... | 425/12 S X |
| 4,680,000 | 7/1987 | Nowicki et al. ............. | 425/126 R |
| 4,686,076 | 8/1987 | Dromigny et al. ......... | 425/397 X |
| 4,710,116 | 12/1987 | Dromigny .................... | 425/125 |

*Primary Examiner*—Robert Spitzer
*Attorney, Agent, or Firm*—Fisher, Christen & Sabol

[57] ABSTRACT

The present invention relates to a machine for molding objects, having male and female mold parts of which at least one is mobile with respect to the other. According to the invention there is included a device for conveying film and a device for conveying a molded object capable of moving in synchronism so that, when the film conveying device is in position of depositing the film between the mold parts, the object conveying device is in position of removal of the object from between the mold parts, and, when the film conveying device is in position of taking of a film for use in a further cycle, the molded object conveying device is in position of evacuation of the object from the mold.

10 Claims, 5 Drawing Sheets

MACHINE FOR MOLDING OBJECTS

The present invention relates to a machine for moulding objects, comprising a male mould part and a femal mould part of which at least one is mobile with respect to the other in a first direction.

In known moulding machines, in which a film of determined format must be guided between the male and female parts of the mould so as to "integrate" the film in the object which will be moulded, positioning of the film takes place at the moment of opening of the mould, and the moulded object is generally evacuated from the mould with the aid of ejectors provided on one or the other part of the mould, the mould then, obviously, being open.

Now, such moulding machines present a major drawback in that the positioning of the film and/or the ejection of the object, for different technical reasons, do not always take place at the appropriate moment, which may lead to delays or interruptions in the cycle of manufacture and thus to an increase in production costs of the moulded objects.

It is an object of the present invention to avoid this drawback by providing a moulding machine in which positioning of the film and evacuation of the object take place under such conditions that continuity of the cycles of manufacture of the moulded objects is reliably guaranteed.

To that end, the machine for moulding objects, of the type comprising a male mould part and a female mould part of which at least one is mobile with respect to the other in a first direction, is noteworthy, according to the invention, in that it comprises:

a device for conveying a film of determined format, intended to serve as at least partial coating of the moulded object, between a position of taking from a magazine containing a plurality of said films and a position of deposit of the film between said male and female mould parts, said film-conveying device comprising means for taking a film from said magazine capable of moving, in a movement associated with that of said mould parts, in a second direction transverse to said first direction between said position of film-taking and said position of deposit, and a device for conveying a moulded object between a position of removal of the object between said male and female mould parts and a position of evacuation of the object, said object conveying device comprising means for taking the object from the mould capable of moving, in a movement associated with that of said mould parts, in said second direction transverse to said first direction, between said position of removal and said position of evacuation, said film-conveying device and moulded object conveying device being capable of moving in synchronism so that, when the film conveying device is in position of deposit of the film between said mould parts, the object conveying device is in position of removal of the object between said mould parts, and, when the film-conveying device is in position of removal of a film from said magazine, the moulded object conveying device is in position of evacuation of the object.

It is thus ensured that the removal of the object which has just been moulded and the deposit of the film intended to coat the object which will be moulded during the following cycle take place simultaneously, or at least virtually simultaneously, without risk of disturbing the cycle of manufacture of the object and whilst increasing the rate of production.

In a preferred embodiment of the invention, in which said first and second directions are at right angles, the film-taking means and the objectremoving means are mounted on the same support and, in particular, in that case, the film-taking means and the object-removing means may be driven by a system of two intersecting racks meshing with each other, of which one, parallel to said first direction, is fast with a part of the mould and the other, parallel to said second direction and mobile parallel to said second direction, is fast with said support.

In a machine in which the film must be deposited at the bottom of the female mould part and the moulded object, when the mould is opened, is borne by the male mould part, according to another feature of the invention, the means for taking the film are associated with means, such as a linear stroke jack, for displacing them in the first direction so as to be able to deposit the film exactly at the bottom of the cavity of the female mould part.

Similarly, the means for removing the object may be associated with means such as a linear stroke jack for displacing them in the first direction and to bring them exactly in contact with the object on the male part of the mould.

Moreover, the means for removing the object may be associated with means such as a rotary jack for pivoting them about an axis perpendicular to the plane defined by said first and second directions.

In the latter case, a system for stacking objects may be arranged so as to be opposite the object removing means in pivoted position of said means.

According to another feature of the invention, the film-taking means and the object-removing means comprise, respectively, at least one depression nozzle.

According to a further feature of the invention, the magazine is associated with drive means, such as a linear stroke jack, for animating the latter in a reciprocating movement parallel to said first direction so as to bring the end film contained in said magazine in contact with said film-taking means.

The invention will be more readily understood on reading the following description with reference to the accompanying drawings, in which.

Figure 1:
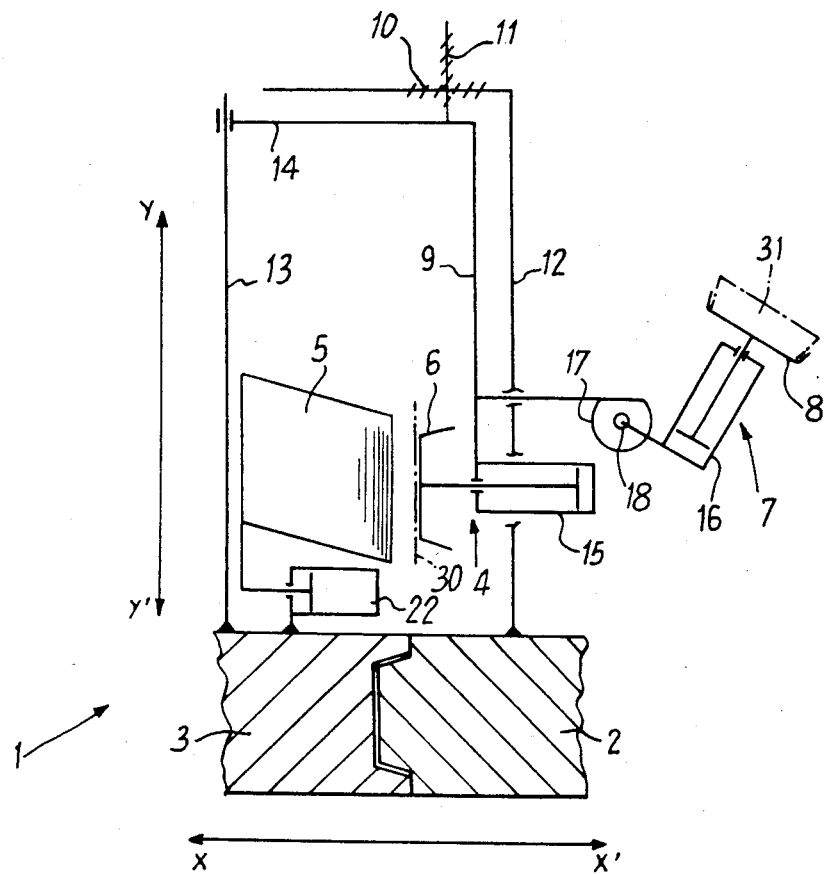
FIG. 1 is a schematic view in elevation of the moulding machine according to the invention.

Referring now to the drawings, the machine 1 for moulding objects, schematically shown in FIG. 1, comprises a male mould part 2 and a female mould part 3 of which at least one is mobile with respect to the other in a first direction X, X'.

Moreover, it comprises a device 4 for conveying a film of determined format, serving as at least partial coating of the moulded object, between a position of taking from a magazine 5 containing a plurality of said films and a position of deposit of the film between the male mould part 2 and female mould part 3 (the mould then being in open position). The film-conveying device 4 comprises means 6 for taking a film from the magazine 5, capable of moving, in a movement associated with that of the mould parts 2 and 3, in a second direction Y, Y' at right angles to the first direction X, X' between the position of taking and the position of deposit.

In addition, the moulding machine 1 comprises a device 7 for conveying a moulded object between a position of taking the object between the male and female mould parts 2 and 3 (with mould in open position) and a position of evacuation of the object. The object conveying device 7 comprises means 8 for removing the object from the mould capable of moving, in a movement associated with that of the mould parts 2 and 3, in the second direction Y, Y' at right angles to the first direction, between the position of taking and position of evacuation.

As will be seen in greater detail with reference to FIGS. 3a to 3f, the film-conveying device 4 and the moulded object conveying device 7 are capable of moving in synchronism so that, when the film-conveying device 4 is in position of deposit of the film between the mould parts 2 and 3, the object-conveying device 7 is in position of taking the object between the mould parts 2 and 3 and, when the film-conveying device 4 is in position of taking a film from the magazine 5, the moulded object conveying device 7 is in position of evacuation of the object.

The film-conveying device 4 and the object-conveying device 7, and in particular, the film-taking means 6 and the object-taking means 8, are mounted on the same support 9, via which they are driven by a system of two intersecting racks 10 and 11 meshing with each other. One of said racks, 10, parallel to the first direction X, X', is fast with a mould part (the male mould part 2 in the example shown) via a support 12, and the other, 11, parallel to the second direction Y, Y' and mobile parallel to said second direction Y, Y', being slidable on a support 13 fast with the female mould part 3 via a guide 14, is fast with the support 9 bearing the film-conveying device 4 and the object-conveying device 7.

In the embodiment shown, the film having to be deposited at the bottom of the female mould part 3 and the moulded object, when the mould is open, being borne by the male mould part 2, the film-taking means 6 are associated with a linear stroke jack 15 adapted to displace them in the first direction X, X' so as to be able to deposit the film exactly at the bottom of the mould.

Similarly, the means 8 for taking the object are associated with a linear stroke jack 16 adapted to displace them in the first direction X, X' to bring them exactly in contact with the object on the male part 2 of the mould, as well as with a rotary jack 17 for pivoting them about an axis 18 perpendicular to the plane defined by the first (X, X') and second (Y, Y') directions.

A first object stacking system (FIGS. 3c and 3d) is arranged so as to be opposite the object-taking means 8 with jack 17 in pivoted position.

Figure 2:
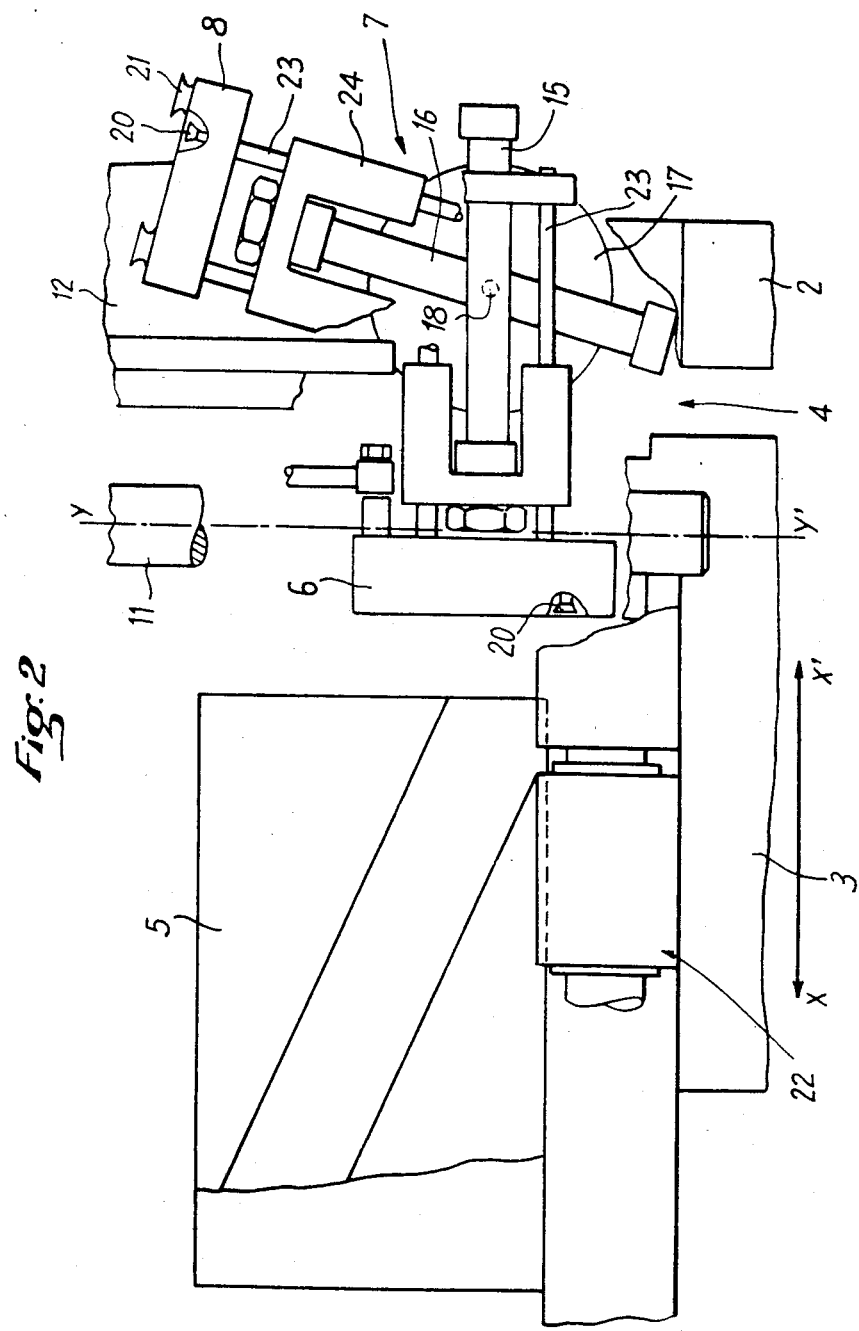
FIG. 2 illustrates in greater detail part of the moulding machine of FIG. 1.

The film-taking means 6 and the object-taking means 8 comprise depression nozzle 20 and possibly suction cups 21 (FIG. 2).

In addition, the magazine 5 is associated with a drive jack 22 adapted to animate the magazine in a reciprocating movement parallel to the first direction X, X', so as to bring the end film contained in the magazine 5 into contact with the film-taking means 6.

As may be seen in FIG. 2, the film-conveying device 4 and the object-conveying device 7 comprise ejectors 23 for ejecting either the film or the object, adapted to slide in bushes 24.

A cycle of manufacture of a moulded object will be described hereinafter with reference to FIGS. 3a to 3f.

The initial step (FIG. 3a) is considered as being the one during which the means 6 for taking a film 30 deposit the latter at the bottom of the cavity of the female mould part 3 (where it is taken up by depression means which have not been shown), and this by displacing means 6 with the aid of jack 15 in direction X, X', whilst the means 8 for taking the object which has just been moulded (not visible in FIG. 3a in order to render the drawing clearer) and which is borne by the male mould part 2 seizing the object, being displaced against part 2 with the aid of jack 16.

The film-taking means 6 are then withdrawn from the cavity of the female mould part 3 with the aid of jack 15, whilst the object-taking means 8 are disengaged from the male mould part 2 with the aid of the jack 16 (position in broken lines in FIG. 3b), taking object 31 along by depression, after which the means 8 are pivoted about axis 18 with the aid of the rotary jack 17.

In a third step (FIG. 3c), the rack system 10 and 11 makes it possible to drive (in direction Y, Y') the film-conveying device 4 into position of taking opposite magazine 5 and, at the same time, the object-conveying device 7 into position of evacuation opposite the system 19 for stacking moulded objects. Simultaneously, the mould 2, 3 closes.

Then, in a fourth step (FIG. 3d), the jack 22 makes it possible to drive magazine 5 in the direction X, X', against the film-taking means 6, whilst the actuation of jack 16 makes it possible to introduce the object 31 which has just been moulded into the stacking system where it is maintained by appropriate means after the objects moulded previously.

Figure 3A:
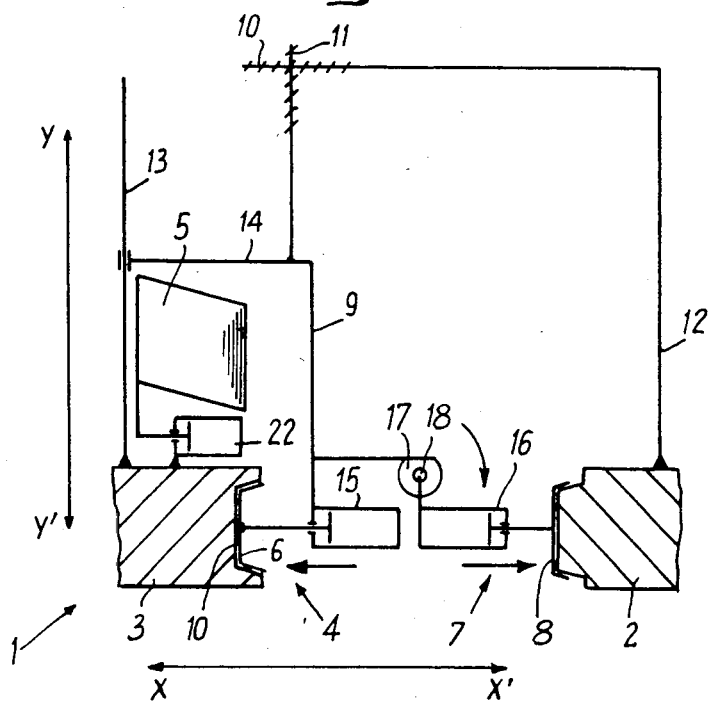
FIGS. 3a to 3f illustrate the different operational steps of the machine according to the invention.
Figure 3B:
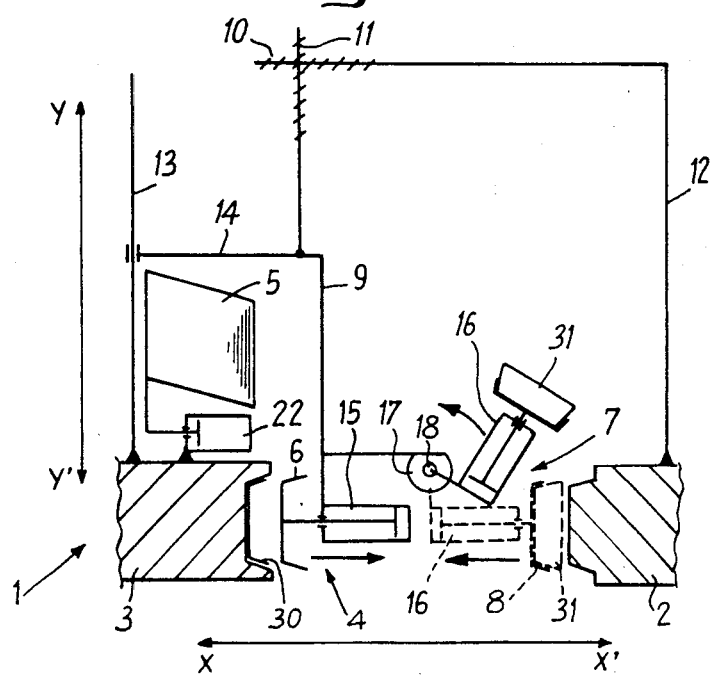
Figure 3C:
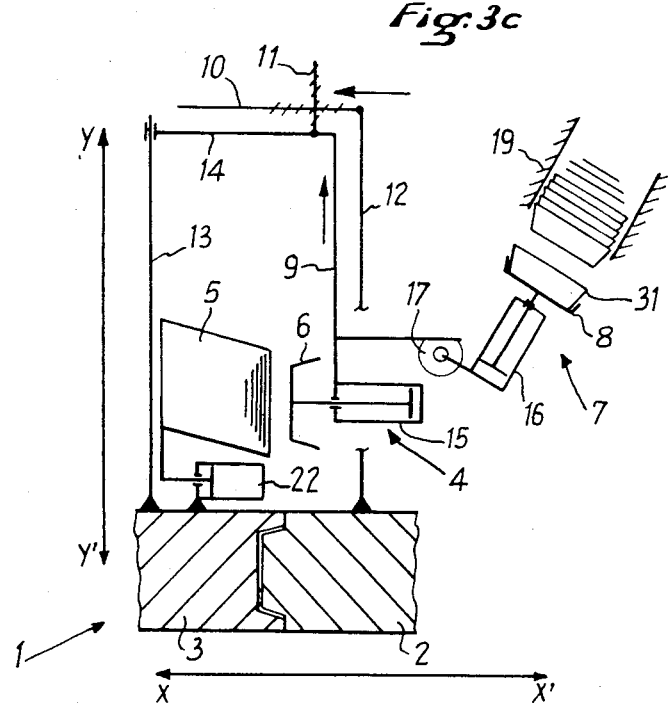
Figure 3D:
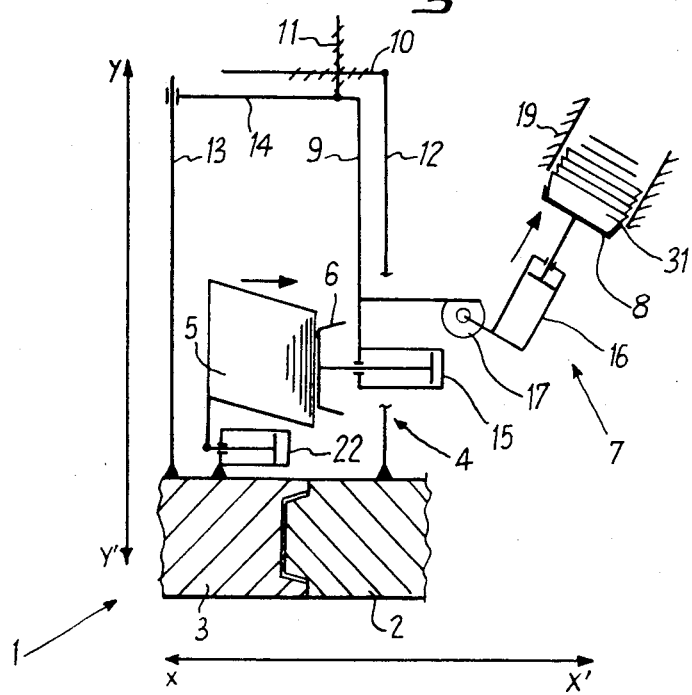
Figure 3E:
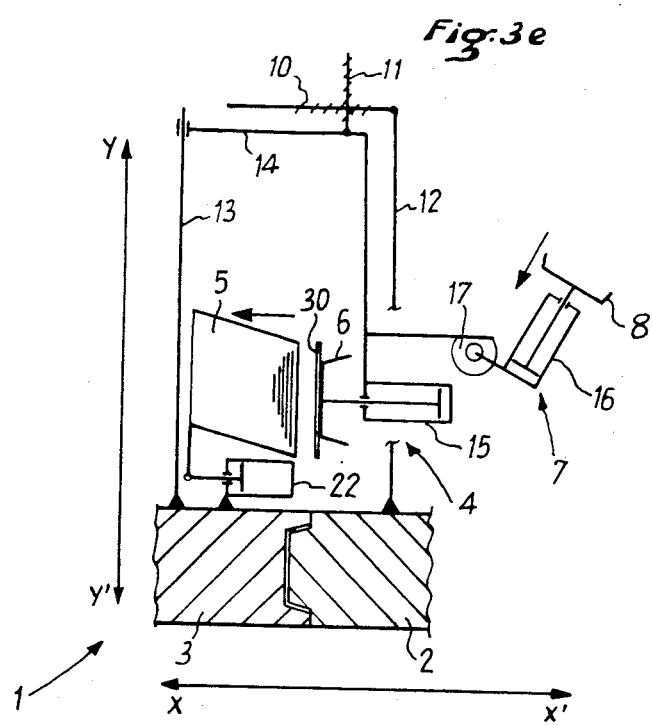
Figure 3F:
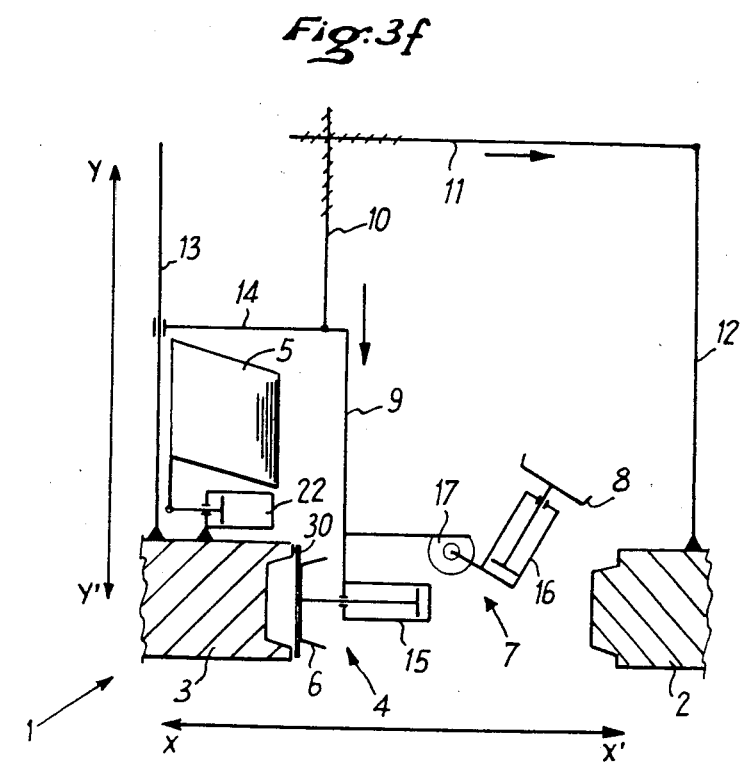

Once the magazine 5 lies against the film-taking means 6, the end film 30 which is contained therein may be seized by said means 6 and maintained thereagainst by depression, whilst the jack 22 returns the magazine 5 to its position of FIG. 3c (FIG. 3e). At the same time, the jack 16 returns the object-taking means 8 in their retracted position.

During subsequent opening of the mould 2, 3 (FIG. 3f), the device 4 for conveying the film 30 is driven by the system of racks 10 and 11 into position of deposit opposite the cavity of the female mould part 3, whilst the object-conveying device 7 is taken in the vicinity of the male mould part 2, position in which the actuation of the rotary jack 17 will make it possible to bring the object-taking means 8 opposite part 2, then, by actuation of jack 16, against the object which has just been moulded, whilst the mould was closed. At the same time, the jack 15 takes the means 6 with the film which is maintained therein to the bottom of the cavity of the female mould part 3. The cycle therefore terminates by a return to the initial step illustrated in FIG. 3a, followed immediately by another identical cycle of manufacture of a moulded object.

What is claimed is:

1. In a machine for moulding objects, of the type comprising a male mould part and a female mould part of which at least one is mobile with respect to the other in a first direction, of the type comprising:

a device for conveying a film of determined format, intended to serve as at least partial coating of the moulded object, between a position of taking from a magazine containing a plurality of said films and a position of deposit of the film between said male and female mould parts, said film-conveying device comprising means for taking a film from said magazine capable of moving, in a movement associated with that of said mould parts, in a second direction (Y, Y') transverse to said first direction (X, X') between said position of film-taking and said position of deposit, and a device for conveying a moulded object between a position of removal of the object between said male and female mould parts and a position of evacuation of the object, said object conveying device comprising means for taking the object from the mould capable of moving, in a movement associated with that of said mould parts, in said second direction (Y, Y') transverse to said first direction (X, X'), between said position of removal and said position of evacuation, said film-conveying device and moulded object conveying device, mounted on the same support, being capable of moving in synchronism so that, when the film conveying device is in position of deposit of the film between said mould parts, the object conveying device is in position of removal of the object between said mould parts, and, when the film-conveying device is in position of removal of a film from said magazine, the moulded object conveying device is in position of evacuation of the object, the means for taking the film and the means for removing the object are driven by a system of two intersecting racks meshing with each other, of which one, parallel to said first direction (X, X'), is fast with a mould part and the other, parallel to said second direction (Y, Y') and mobile parallel to said second direction, is fast with said support.

2. The machine of claim 1, in which the film must be deposited at the bottom of the female mould part and the moulded object when the mould is open is borne by the male mould part, wherein the film-taking means are associated with means for deplacing the film in the first direction (X, X') so as to be able to deposit the film exactly in the bottom of the cavity of the female mold part.

3. The machine of claim 2, wherein the object removing means are associated with means for displacing the object removing means in the first direction (X, X') to bring the object removing means exactly in contact with the object on the male part of the mould.

4. The machine as in claim 3 wherein the means for displacing the object removing means is a linear stroke jack.

5. The machine of claim 2, wherein the object removing means are associated with means for pivoting the object removing means about an axis perpendicular to the plane defined by said first and second directions (X, X'), (Y, Y') respectively.

6. The machine of claim 5, characterized by a means for stacking objects arranged so as to be opposite the object removing means in pivoted position of said means.

7. The machine as in claim 5 wherein the means for pivoting the object removing means is a rotating jack.

8. The machine of claim 2 wherein the means for displacing the film in the first direction is a linear stroke jack.

9. The machine of claim 1,
wherein the film-taking means and the object removing means comprise, respectively, at least one depression nozzle.

10. The machine of claim 1, wherein the magazine is associated with a drive means for animating the drive means in said first direction (X, X') so as to guide an end film contained in said magazine in contact with said film-taking means.

* * * * *